United States Patent Office 2,740,810
Patented Apr. 3, 1956

2,740,810

PREPARATION OF 2-METHYL-4-CHLORO-PHENOXYACETIC ACID

Maxwell J. Skeeters, Painesville, Ohio, assignor to Diamond Alkali Company, Cleveland, Ohio, a corporation of Delaware No Drawing. Application May 4, 1954,
Serial No. 427,665

6 Claims. (Cl. 260—521)

This invention relates to improvements in the manufacture of organic compounds, and more particularly relates to the manufacture of chlorinated cresoxyacetic acid. The expression "chlorinated cresoxyacetic acid," as used in the specification and claims, unless otherwise indicated, is intended to include functional derivatives of that acid, including esters, amides, and salts thereof.

Chlorinated cresoxyacetic acid, particularly 2-methyl-4-chlorophenoxyacetic acid, is a known effective hormone-type weed killer having general herbicidal properties. The material is preferred, in some instances, over 2,4-dichlorophenoxyacetic acid (2,4-D), particularly in those applications for cereal crops grown in relatively cool climates. The particular effectiveness arises both from the toxic effect of 2-methyl-4-chlorophenoxyacetic acid against undesired weeds, such as Canada thistle, whitetop, and certain species of the mustard family, as well as high toleration by cereal crops to the use of the material, such as crops including flax, oats, wheat, barley, rye, and rice. Hence, the material is thoroughly established as a useful herbicidal composition and has gone into relatively wide use in formulations for application to such crops.

Various methods have heretofore been proposed for the manufacture of 2-methyl-4-chlorophenoxyacetic acid. For example, it has been proposed to chlorinate cresol and to condense the chlorinated product with monochloracetic acid to obtain 2-methyl-4-chlorophenoxyacetic acid. However, such a process produces a yield rarely in excess of 65% of desired product, the remaining portion being the 2-methyl-6-chloro isomer and other unwanted materials. Such materials, although apparently not unduly toxic to cereal crops and the like, to which the materials are applied, are useless as weed killers and therefore amount to inert diluents in the ultimate material. Hence, the wastage of upwards of 35% to 40% of the raw material employed renders such a process uneconomical.

In the case of the related 2,4-dichlorophenoxyacetic acid, it has been proposed to synthesize it by the condensation of phenol with monochloracetic acid, followed by dichlorination of the resultant condensation product. It has been proposed to accomplish this dichlorination by employing molten phenoxyacetic acid and chlorinating it under various conditions. This proposal has failed of adoption, primarily, since high temperatures of chlorination are required, and since losses of chlorine and a degradation of the phenoxyacetic acid are necessarily encountered. Moreover, upon chlorination of the phenoxyacetic acid, there is a considerable yield of undesired isomers which reduces the value of the ultimate product and, again, amounts to a wastage of raw material.

It has also been proposed, in connection with the manufacture of 2,4-dichlorophenoxyacetic acid, to condense phenol with monochloracetic acid and to follow this condensation reaction by dichlorination, in stepwise stages. This process, however, apparently is not adapted for commercial operation, since the best yield of the desired 2,4-dichlorophenoxyacetic acid product obtained is of the order of 80%.

The present invention has for its principal object the production of 2-methyl-4-chlorophenoxyacetic acid with substantially 100% active isomer in a high yield. The formula for this compound is

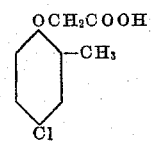

In prior methods of chlorinating cresoxyacetic acid, it has frequently been the practice to conduct the chlorination in glacial acetic acid. While such a medium has provided satisfactory chlorination results in many instances, the rather serious problem of process equipment corrosion caused by the acetic acid has been necessarily encountered, both in liquid and vapor phases. Moreover, in order to render such a process commercially feasible, it is necessary to recover a certain proportion of the acetic acid. This not only increases the amount of equipment exposed to the corrosive effect of acetic acid but, since the acetic acid is relatively difficult to recover economically, particularly in dilute solutions, added equipment and process costs are incurred.

Accordingly, it is a further object of the present invention to avoid the foregoing difficulties encountered by prior methods and to provide an improved method wherein not only is a high yield of substantially pure product obtained but also the heretofore encountered problems of equipment corrosion and handling difficulties are eliminated.

The present invention contemplates producing chlorinated cresoxyacetic acid by the chlorination of methyl phenoxyacetic acid in a reaction medium comprising 1,2-dichloropropane. The advantages obtained, although surprising, are substantial. Not only is any problem of equipment corrosion eliminated, but also the recovery of solvent is readily accomplished. Moreover, the 1,2-dichloropropane exhibits a singular combination of desirable properties not shared by other chlorinated aliphatic compounds. More particularly, 1,2-dichloropropane has a relatively low toxicity, which obviously is advantageous. In addition, it is not appreciably lost during the chlorination reaction, yet following the chlorination reaction it is readily removed from the reaction product.

The practice of the present invention contemplates the chlorination of methyl phenoxyacetic acid in 1,2-dichloropropane alone and also in the presence of a solvent chlorination inhibitor, including metal halides, such as ferric chloride, or halogens, such as iodine or bromine.

While the quantity of reactants to be employed can, of course, be varied somewhat, depending on the particular conditions of reaction, it has been discovered that there is an optimum ratio of chlorine to methyl phenoxyacetic acid which, when established during the chlorination, provides a superior yield of high purity product. More particularly, it has been found that when the molar ratio of chlorine to methyl phenoxyacetic acid is maintained within the range from 1.0:1.0 to 1.15:1.0 an optimum yield of desired product is obtained. It has also been found that within this range the preferred ratio of chlorine to methyl phenoxyacetic acid is 1.1:1.0.

Although the practice of the present invention contemplates chlorination in the absence of any catalyst or inhibitor, in many instances the use of a small amount of iodine or ferric chloride is desirable. Generally, iodine is the preferred solvent chlorination inhibitor because it is readily removed following the reaction, but also is easily inactivated with sodium thiosulfate in those instances where the filtrate is to be stored or where the solvent is to be distilled.

The reaction embodying the present invention generally comprises mixing methyl phenoxyacetic acid, preferably substantially water-free, and 1,2-dichloropropane, adding thereto a small quantity of ferric chloride or iodine, if desired, and thereafter introducing a sufficient amount of chlorine to insure complete reaction, a 5% to 10% excess over the theoretical quantity required being a typically practicable amount in accordance with the aforementioned optimum chlorine to methyl phenoxyacetic acid ratios. The chlorination reaction is exothermic and only when the chlorine concentration is low or as the reaction nears completion it is necessary to apply external heat.

The reaction mass is then cooled and filtered, the filtrate being recycled as inert solvent for use in subsequent chlorination operations, if desired. The filter cake, substantially pure chlorinated cresoxyacetic acid, is preferably washed with either the same or a different aliphatic compound, typically dichloroethane or trichloroethane, and is dried. Yields of better than 75% of chlorinated cresoxyacetic acid in high purity are obtained.

In order that those skilled in the art may better understand the present invention and the preferred methods by which the same may be carried into effect, the following specific examples are offered:

EXAMPLE I

Into a reaction vessel are added 100 pounds of methyl phenoxyacetic acid, 331.3 pounds of 1,2-dichloropropane, and 0.24 pound of iodine. The mixture is heated to 85° C. and the introduction of chlorine begun. Heating is continued until 48.2 pounds of chlorine have been introduced and thereafter, during the introduction of the remaining 48.2 pounds of chlorine, since the reaction is exothermic, only when the reaction temperature drops below 88° C. When chlorination is complete, the hot mixture is decanted, cooled gradually to room temperature, and then chilled to 10° C. and filtered. The filter cake is washed with two 40-pound portions of cold solvent and filter dried. The combined filtrate and wash liquor are recycled as solvent for a subsequent batch.

The product, in a yield of 80%, is a 98% 2-methyl-4-chlorophenoxyacetic acid.

EXAMPLE II

Into a 500 ml., 3-necked, round-bottomed flask equipped with a thermometer, a gas dispenser, and a reflux condenser are introduced 275 grams of 1,2-dichloropropane, 83 gms. of methyl phenoxyacetic acid, and 0.5 gm. of ferric chloride. The resultant mixture is heated to 60° C. and a total of 39 gms. of chlorine is added over a period of 1 hour while the temperature is maintained between 60° and 80° C., complete dissolution of the methyl phenoxyacetic acid being obtained after introduction of 30 gms. of chlorine.

After the addition of all the chlorine, the solution is allowed to settle and the clear liquor decanted and cooled slowly to room temperature and then chilled to 10° C. and filtered. The filter cake is washed with 50 gms. of cold dichloropropane and air-dried to produce a yield of 78% of product containing 94% 2-methyl-4-chlorophenoxyacetic acid.

EXAMPLE III

Part A

Into a 500 ml., 3-necked, round-bottomed flask equipped with a thermometer, a gas dispenser, and a reflux condenser are introduced 83 gms. of methyl phenoxyacetic acid, 275 gms. of dichloropropane, and 0.1 gm. of iodine. The mixture is heated to a temperature of about 60° C., at which time the introduction of a total of 37.5 gms. of chlorine (5% excess of theoretical) is begun. The addition of all the chlorine requires a period of 50 minutes, during which time the reaction temperature is maintained between 85° and 95° C.

Following the addition of all the chlorine the reaction mass is cooled slowly to room temperature and then chilled to 8° C. and filtered. The filter cake is washed with 20 cc. of cold dichloropropane and air-dried to produce a yield of 79% product containing 98% 2-methyl-4-chlorophenoxyacetic acid.

Part B

Using a solvent comprising the filtrate and wash liquors of Part A, a second chlorination reaction is conducted according to the method of Part A. The product obtained is in an 81% yield and contains 98% 2-methyl-4-chlorophenoxyacetic acid.

Part C

Using the combined filtrate and wash liquor resulting from the experiment conducted in Part B as a solvent, a third chlorination reaction is conducted according to Part A. The product obtained is in an 88% yield and contains 97% 2-methyl-4-chlorophenoxyacetic acid.

While there have been described various embodiments of the invention, the methods described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of preparing 2-methyl-4-chlorophenoxyacetic acid which comprises chlorinating cresoxyacetic acid in the presence of 1,2-dichloropropane.

2. The method of preparing 2-methyl-4-chlorophenoxyacetic acid which comprises chlorinating cresoxyacetic acid in a solution of 1,2-dichloropropane.

3. The method of preparing 2-methyl-4-chlorophenoxyacetic acid comprising passing chlorine into a mixture of cresoxyacetic acid and 1,2-dichloropropane.

4. The method according to claim 3 in which the ratio of chlorine added to cresoxyacetic acid is within the range from about 1.0:1.0 to 1.15:1.0.

5. The method according to claim 2 in which 2-methyl-4-chlorophenoxyacetic acid is recovered by crystallization in situ.

6. The method of preparing 2-methyl-4-chlorophenoxyacetic acid which comprises the steps of chlorinating cresoxyacetic acid in the presence of 1,2-dichloropropane, cooling the reaction mass, and recovering the desired product by crystallization in situ.

References Cited in the file of this patent

UNITED STATES PATENTS 2,437,527   Hester et al. _____ Mar. 9, 1948

OTHER REFERENCES

Haskelberg: J. Org. Chem. vol. 12, 426–33 (1947).